US012804502B2

(12) United States Patent

Park et al.

(10) Patent No.: US 12,804,502 B2
(45) Date of Patent: Nov. 17, 2026

(54) METHOD AND DEVICE FOR SUPPORTING TERMINAL MOBILITY IN WIRELESS COMMUNICATION SYSTEM

(71) Applicant: SAMSUNG ELECTRONICS CO., LTD., Suwon-si (KR)

(72) Inventors: Jungshin Park, Suwon-si (KR); Youngkyo Baek, Suwon-si (KR); Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 18/261,646

(22) PCT Filed: Jan. 17, 2022

(86) PCT No.: PCT/KR2022/000850

§ 371 (c)(1),
(2) Date: Jul. 14, 2023

(87) PCT Pub. No.: WO2022/154628

PCT Pub. Date: Jul. 21, 2022

(65) Prior Publication Data

US 2024/0314649 A1 Sep. 19, 2024

(30) Foreign Application Priority Data

Jan. 15, 2021 (KR) ........................ 10-2021-0006330

(51) Int. Cl.
*H04W 36/32* (2009.01)
*H04W 36/00* (2009.01)
(Continued)

(52) U.S. Cl.
CPC ... *H04W 36/322* (2023.05); *H04W 36/00222* (2023.05); *H04W 36/0061* (2013.01); *H04W 36/185* (2023.05); *H04W 36/1443* (2023.05)

(58) Field of Classification Search
USPC ............................................................ 455/43
See application file for complete search history.

(56) References Cited

U.S. PATENT DOCUMENTS 11,206,711 B2 12/2021 Park et al.
2015/0003243 A1* 1/2015 Klingenbrunn ....... H04W 36/26 370/230

(Continued)

FOREIGN PATENT DOCUMENTS

WO 2019078683 A1 4/2019
WO 2020038561 A1 2/2020
WO 2020253788 A1 12/2020

OTHER PUBLICATIONS

International Search Report and Written Opinion of the International Searching Authority dated Apr. 21, 2022, in connection with International Application No. PCT/KR2022/000850, 9 pages.

(Continued)

*Primary Examiner* — Charles N Appiah
*Assistant Examiner* — Frank E Donado

(57) ABSTRACT

The disclosure relates to a 5G or 6G communication system for supporting a higher data transmission rate. A method performed by a terminal in a mobile communication system is provided according to one embodiment of the present disclosure. The method comprises the steps of: transmitting a first message, comprising network function information of the terminal, to a mobility management entity associated with a first network; if the network function information instructs support for a second network, receiving a second message comprising connection reactivation request information from the mobility management entity; releasing the connection with respect to the first network in response to the second message; transmitting a third message, for reestablishing connection to the first network, to the mobility management entity on the basis of the connection reactivation request information. The third message comprises an identifier of a first session for the second network corresponding to the connection with respect to the first network allocated by the terminal.

10 Claims, 15 Drawing Sheets

(51) Int. Cl.
*H04W 36/18* (2009.01)
*H04W 36/14* (2009.01)

(56) References Cited

U.S. PATENT DOCUMENTS

| | | | | |
|---|---|---|---|---|
| 2019/0159157 | A1 * | 5/2019 | Gupta | H04W 36/0033 |
| 2020/0329397 | A1 | 10/2020 | Huang-Fu | |
| 2021/0185524 | A1 * | 6/2021 | Wu | H04W 12/043 |
| 2022/0117023 | A1 * | 4/2022 | Tao | H04W 36/125 |
| 2022/0408320 | A1 * | 12/2022 | Zhu | H04W 36/0016 |
| 2024/0049067 | A1 * | 2/2024 | Duan | H04W 36/13 |
| 2024/0205757 | A1 * | 6/2024 | Zhang | H04W 36/00226 |

OTHER PUBLICATIONS

Huawei et al., "5GCN-EPC interworking over SM with N26 due to N1/S1 mode capability disabling/enabling," C1-207351, 3GPP TSG CT WG1 Meeting #127e, 4 pages.
Ericsson, "General cleanup of specification," S2-2008428, 3GPP TSG-SA2 Meeting # 142e, 554 pages.
Mediatek Inc., "MA PDU session handling when UE moves between EPS and 5GS," S2-1907347, 3GPP TSG-SA2 Meeting #134, 6 pages.
Supplementary European Search Report dated May 21, 2024, in connection with European Patent Application No. 22739820.3, 14 pages.
Huawei et al., " Interworking to 5GS over SM with N26 due to UEs N1 mode capability disabling/enabling", C1-207352, 3GPP TSG-CT WG1 Meeting #127-e, Electronic meeting, Nov. 13-20, 2020, 9 pages.
3GPP TS 23.502 V15.2.0 (Jun. 2018) Technical Specification, 3rd Generation Partnership Project; Technical Specification Group Services and System Aspects; Procedures for the 5G System; Stage 2 (Release 15), Jun. 2018, 308 pages.
Office Action issued Aug. 12, 2025, in connection with Japanese Patent Application No. 2023543063, 8 pages.
Qualcomm Incorporated, "5GCN-EPC interworking with N26 due to N1/S1 mode capability disabling/re-enabling," 3GPP TSG CT WG1 #127e, C1-207316 , Nov. 2020, 3 pages.
Huawei, et al., "5GCN-EPC interworking over SM with N26 due to N1/S1 mode capability disabling/enabling," 3GPP TSG CT WG1 #126e, C1-206086 , Oct. 2020, 6 pages.
Office Action issued Dec. 16, 2025, in connection with Japanese Patent Application No. 2023-543063, 6 pages.
Office Action issued Feb. 12, 2026, in connection with Korean Patent Application No. 10-2021-0006330, 10 pages.

* cited by examiner

CONTINUE

CONTINUE

METHOD AND DEVICE FOR SUPPORTING TERMINAL MOBILITY IN WIRELESS COMMUNICATION SYSTEM

TECHNICAL FIELD

The disclosure relates to a method and device for supporting terminal mobility using 4G and 5G wireless communication systems.

BACKGROUND ART 5G mobile communication technologies define broad frequency bands such that high transmission rates and new services are possible, and can be implemented not only in "Sub 6 GHz" bands such as 3.5 GHz, but also in "*Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

As described above, with the development of wireless communication systems, a need for a method for providing UE mobility in an environment where wireless communication systems of different generations coexist has emerged.

DISCLOSURE OF INVENTION

Technical Problem

The disclosure proposes a method for providing a seamless service to a terminal (UE) using 4G and 5G wireless communication systems.

Solution to Problem

According to an embodiment of the disclosure, a method performed by a terminal in a mobile communication system is provided. The method comprises transmitting a first message, comprising network capability information of the terminal, to a mobility management entity associated with a first network; receiving a second message comprising connection reactivation request information from the mobility management entity in case that the network capability information indicates support for a second network; releasing connection with respect to the first network in response to the second message; and transmitting a third message, for reestablishing connection to the first network, to the mobility management entity based on the connection reactivation request information. The third message comprises an identifier of a first session for the second network corresponding to the connection with respect to the first network allocated by the terminal.

According to an embodiment of the disclosure, a method performed by a mobility management entity associated with a first network in a mobile communication system is provided. The method comprises receiving, from a terminal, a first message comprising network capability information of the terminal, transmitting a second message comprising connection reactivation request information to the terminal in case where the network capability information indicates support for a second network, and receiving a third message for reestablishing connection to the first network from the terminal according to the connection reactivation request information. The connection with respect to the first network is released in response to the second message, and the third message comprises an identifier of a first session for the second network corresponding to the connection with respect to the first network allocated by the terminal.

According to an embodiment of the disclosure, a terminal in a mobile communication system is provided. The terminal comprises a transceiver and a controller. The controller controls the transceiver to transmit a first message, comprising network capability information of the terminal, to a mobility management entity associated with a first network, controls to transceiver to receive a second message comprising connection reactivation request information from the mobility management entity in case that the network capability information indicates support for a second network, controls the transceiver to release connection with respect to the first network in response to the second message and to transmit a third message, for reestablishing connection to the first network, to the mobility management entity based on the connection reactivation request information. The third message comprises an identifier of a first session for the second network corresponding to the connection with respect to the first network allocated by the terminal.

According to an embodiment of the disclosure, a mobility management entity associated with a first network in a mobile communication system is provided. The mobility management entity comprises a transceiver and a controller. A controller controls the transceiver to receive, from a terminal, a first message comprising network capability information of the terminal, controls the transceiver to transmit a second message comprising connection reactivation request information to the terminal in case where the network capability information indicates support for a second network, and controls the transceiver to receive a third message for reestablishing connection to the first network from the terminal according to the connection reactivation request information.

The connection with respect to the first network is released in response to the second message, and the third message comprises an identifier of a first session for the second network corresponding to the connection with respect to the first network allocated by the terminal.

Advantageous Effects of Invention

According to an embodiment of the disclosure, in an environment in which a UE communicates through 4G and 5G wireless communication systems, a data session of the UE is not disconnected and maintained even in the case where UE capability change occurs and the wireless communication system to which the UE accesses is changed.

MODE FOR THE INVENTION

Figure 1:
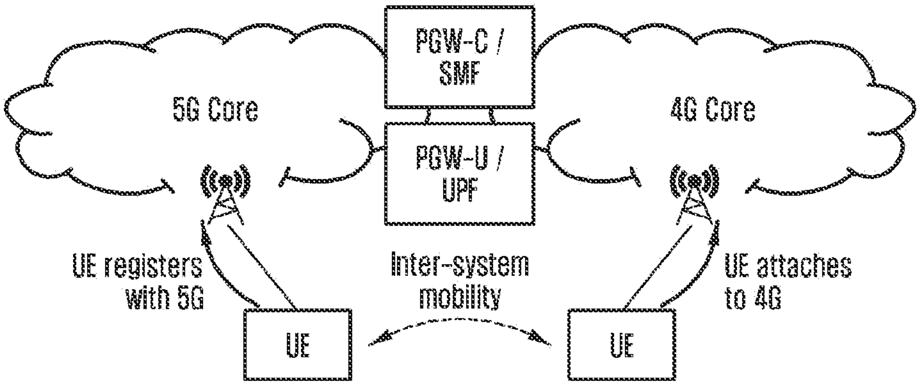
FIG. 1 is a diagram illustrating a method for a UE to communicate while moving in a wireless communication system through a network according to an embodiment of the disclosure.

Hereinafter, an operation principle of the disclosure is described in detail with reference to the accompanying drawings. In describing the disclosure, a detailed description of a related known function or constitution will be omitted in the case that it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

For the same reason, in the accompanying drawings, some components may be exaggerated, omitted, or schematically illustrated. Further, the size of each component does not entirely reflect the actual size. In the drawings, identical or corresponding components are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions.

These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block(s).

Further, each block may represent a module, segment, or portion of code, which includes one or more executable instructions for implementing the specified logical function (s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware component, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software components, object-oriented software components, class components or task components, processes, functions, properties, procedures, sub-routines, segments of a program code, drivers, firmware, micro-codes, circuits, data, database, data structures, tables, arrays, and parameters. The components and functions provided by the "unit" may be either combined into a smaller number of components and "unit" or divided into additional components and "unit". Moreover, the components and "units" may be implemented to reproduce one or more CPUs within a device or a security multimedia card. Also, in the embodiment. 'unit' may include one or more processors.

In describing the disclosure, a detailed description of a related known function or configuration will be omitted in the case that it is deemed to make the gist of the disclosure unnecessarily vague. Embodiments of the disclosure are described hereinafter with reference to the accompanying drawings.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

In the following description, for convenience of explanation, terms and names defined in the most recent standards among the existing communication standards, i.e., in the LTE and NR standard defined in the 3rd Generation Partnership Project (3GPP) will be used. The disclosure is not, however, limited to the terms and names, and may equally apply to any systems that conform to other standards. Especially, the disclosure may be applied to the 3GPP NR (which is the 5G mobile communication standard). In addition, the embodiments of the disclosure may also be applied to other communication systems having a similar technical background or channel form. Also, the embodiments of the disclosure may also be applied to other communication systems through some modifications within a range that does not largely depart from the scope of the disclosure based on determination by a skilled person.

An object of the disclosure is to define a method and device for controlling communication of a UE to enable seamless communication through a network suitable for support by UE capability when UE capability is changed in a wireless communication system.

According to an embodiment of the disclosure, in the case where a UE releases or recovers 5G communication function, it is possible to control the UE to switch to the 4G or 5G network and communicate without disconnection of session in use.

FIG. 1 is a diagram illustrating a method for a terminal to communicate while moving in a wireless communication system through a network according to an embodiment of the disclosure.

With reference to FIG. 1, a method in which a UE initially accesses through one of 4G and 5G networks and communicates while moving through the two networks (inter-system mobility) is illustrated.

For communication, a UE selects an available network among 4G and 5G networks according to UE capability and proceeds with an access procedure, and in this process, information on the UE capability may be transmitted to the selected network.

In the case where the UE capability supports both 4G and 5G, the network that has received the UE capability information may allocate a packet data network gateway-control plane (PGW-C)+session management function (SMF) to the UE in a control plane, and a packet data network gateway-user plane (PGW-U)+user plane function (UPF) to the UE in a user plane to constitute communication session of the UE. The network entity referred to as '4G network entity+5G network entity' such as PGW-C+SMF or PGW-U+UPF in the disclosure may mean the entities that support interworking between a 4G network (EPC) and a 5G network (5 GS).

Alternatively, in the case where the UE capability supports only the 4G network, the network allocates PGW-C and PGW-U to the UE, or in the case where the UE capability supports only the 5G network, the network may allocate SMF and UPF to the UE to constitute communication sessions of the UE.

Figure 2:
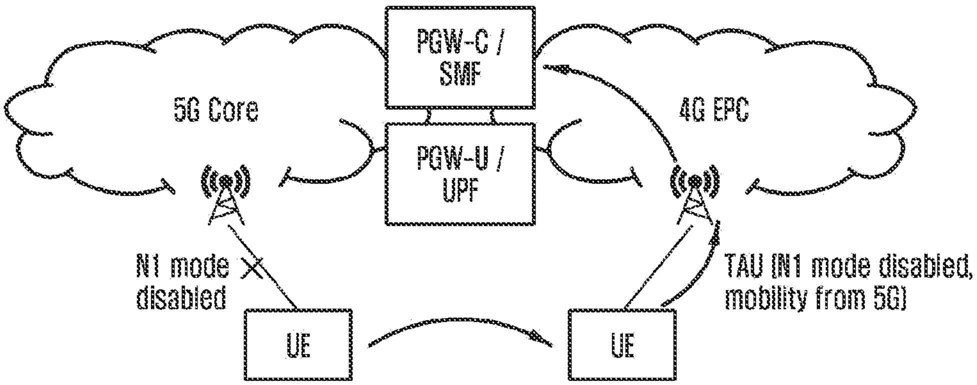
FIG. 2 is a diagram illustrating a method for a terminal to select and access a second network when the connection to a first network with which a UE is currently communicating is interrupted in a wireless communication system according to an embodiment of the disclosure.

FIG. 2 is a diagram illustrating a method for a terminal to select and access a second network when the connection to a first network with which a UE is currently communicating is interrupted in a wireless communication system according to an embodiment of the disclosure.

With reference to FIG. 2, a method for maintaining a session during a process of selecting and accessing a second network (e.g., 4G network) when communication with a first network with which the UE is currently communicating is interrupted due to UE capability change while the UE is communicating with the first network (e.g., 5G network) is illustrated. In the disclosure, the first network and the second network may refer to two networks related to different radio access technologies (RATs), such as a 5G network and a 4G network, for example.

According to the illustrated example, the method proposed in the disclosure may be applied to the process for the UE to stop communication with the 5G network and switch to the 4G network to resume communication in the case where the UE accesses the 50 network and the UE becomes temporarily unable to use 5G functions during communication.

In the process of accessing the 4G network, the UE may include an indicator indicating that the UE has moved from the 5G network and information indicating that the UE capability for 5G cannot be used in a message requesting access to the 4G network (e.g., a Attach Request or TAU Request message), and transmit the message to the 4G network. The network may determine that the UE capability for 5G is unavailable from the UE capability information received from the UE, and may allocate PGW-C+SMF and PGW-U+UPF supporting both 4G and 5G functions to the UE so as to configure a session of the corresponding UE, instead of allocating PGW-C and PGW-U to the UE.

Figure 3A:
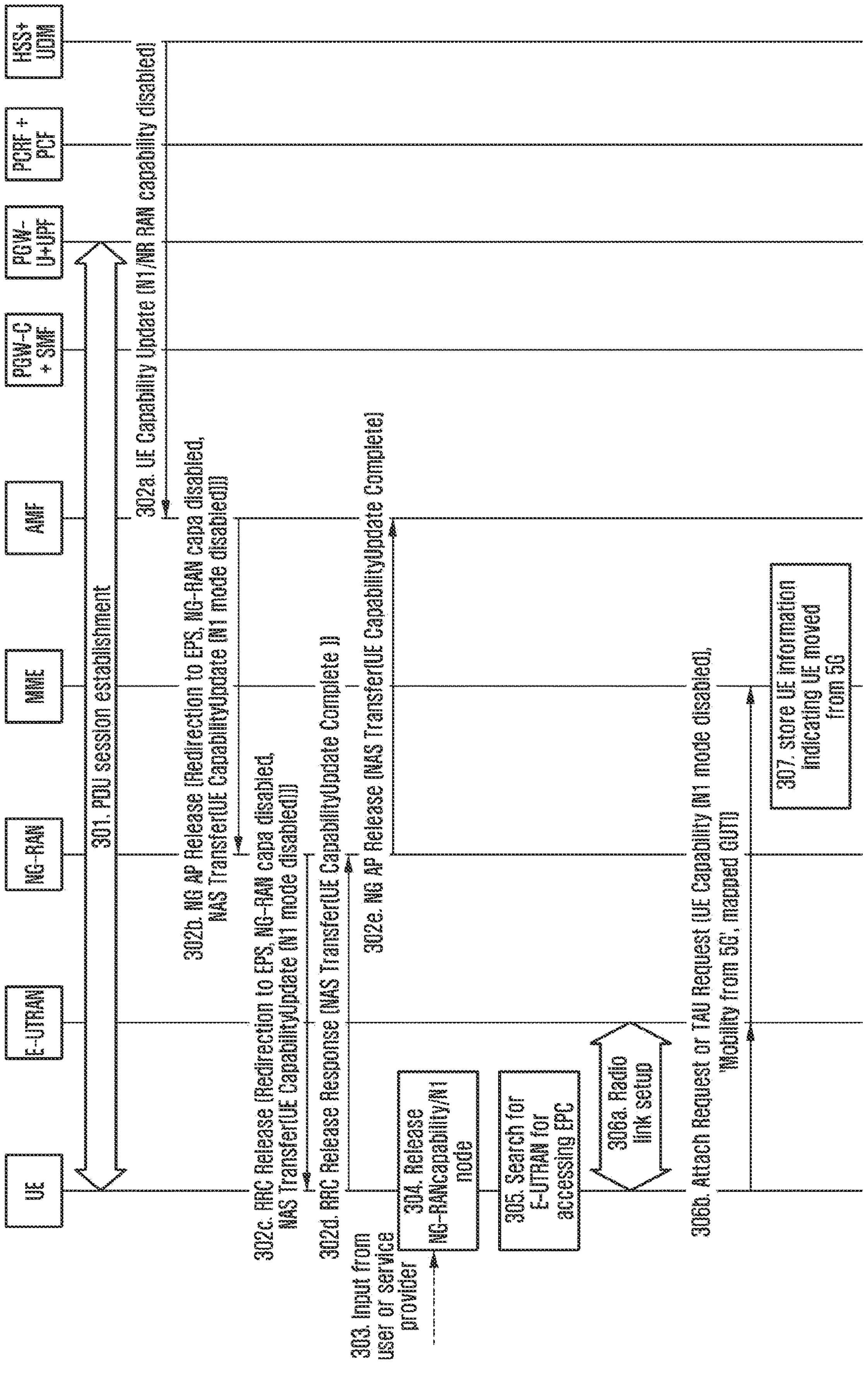
FIG. 3A is a sequence diagram illustrating a procedure for transmitting UE capability information and session information to a network in a process in which a UE accesses a first network and communicates, and switches to and accesses a second network due to UE capability change according to an embodiment of the disclosure.
Figure 3B:
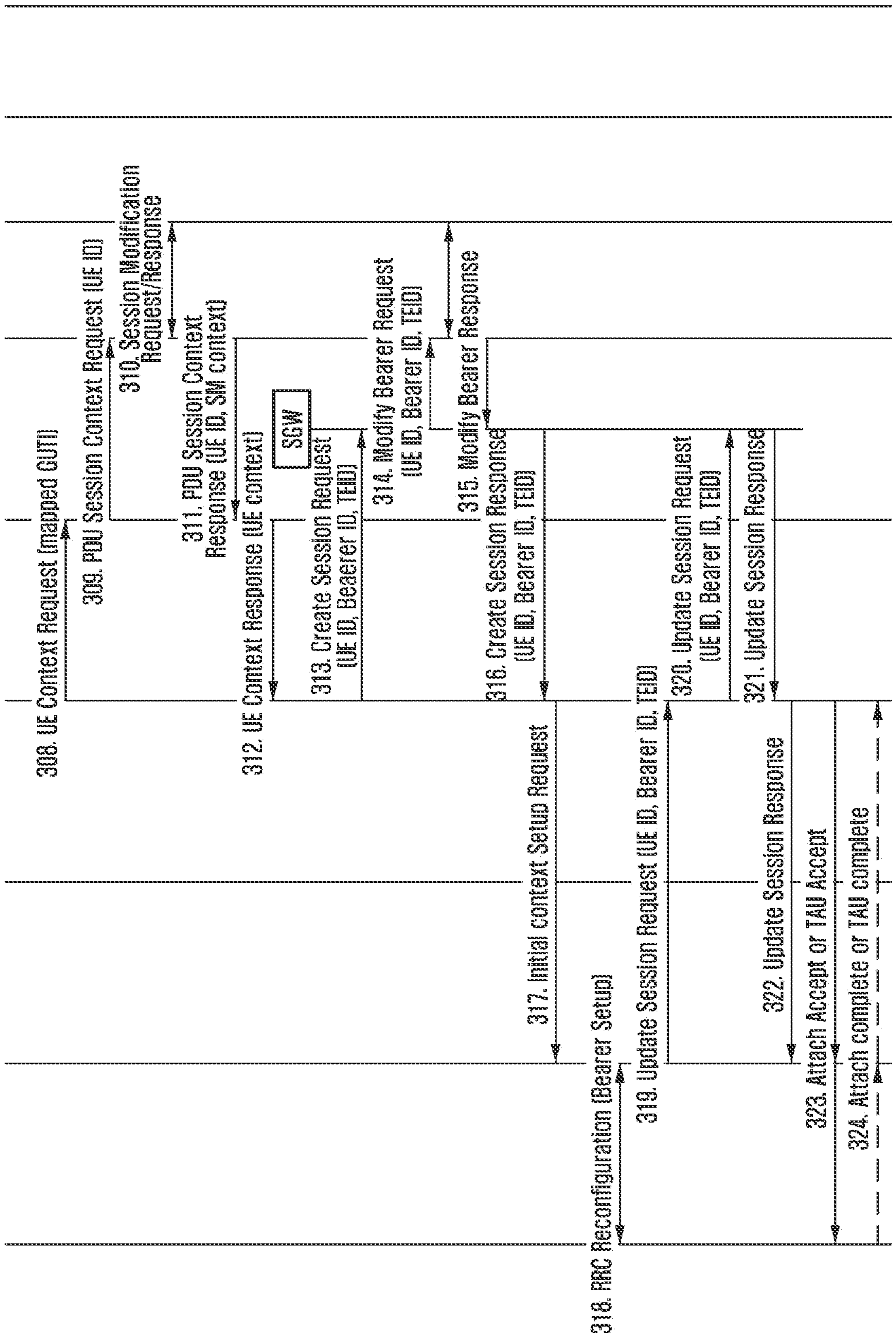
FIG. 3B is a sequence diagram illustrating a procedure for transmitting UE capability information and session information to a network in a process in which a UE accesses a first network and communicates, and switches to and accesses a second network due to UE capability change according to an embodiment of the disclosure.

FIGS. 3A and 3B are sequence diagrams illustrating a procedure for transmitting UE capability information and session information to a network in a process in which a UE accesses a first network and communicates, and switches to and accesses a second network due to UE capability change according to an embodiment of the disclosure. This is for convenience of explanation, and depending on configurations and/or definitions on the system, not necessarily all of the steps described below must be included, and some steps may be omitted.

In the disclosure, a case where a 5G network is used as the first network and a 4G network is used as the second network is described as an example, but the scope of the disclosure is not limited thereto.

In step 301, a UE may access a 5G network, create a protocol data unit (PDU) session, and initiate communication.

Steps 302*a* to 302*e* are procedures that may be applied to a case where UE capability is changed in a network.

Step 302*a* may start with changing subscription information stored in a home subscriber server (HSS)+unified data management (UDM) in the case where a communication service provider or the like wants to change UE capability. The HSS+UDM may transfer the changed UE subscription information to an access and mobility management function (AMF) through a UE Capability Update message in the case where the subscription information is changed. According to an embodiment, the subscription information may include a UE Capability Update parameter (e.g., NR RAN capability disabled) indicating that the UE capability for 5G is disabled. The UE subscription information changed by such a service provider may be used in a scenario where the service provider moves a user to another network in order to change network setup or temporarily disables the current network for a selected UE due to traffic congestion, or the like.

In step 302*b*, the AMF that has received the changed subscription information may include the changed UE capability information in a control message (e.g., NG AP Release message) so that the UE can move to an appropriate network according to the changed condition, and transfer the control message to the NG-RAN (or a 5G base station, or a next generation node B; gNB), and the NG-RAN may transfer the corresponding information received from the AMF to the UE via an RRC Release message in step 302*c*. In addition, the control message may be transferred by additionally including information designating a network to which the UE is going to move when the capability for 5G is released and delay time information until the capability for 5G can be used again. Alternatively, in the case where such information is not provided, the UE may perform the corresponding operation using a value previously stored in the UE by the service provider or the like.

In steps 302*b* and 302*c*, the AMF and the NG-RAN may perform an operation to release the connection between the AMF and the NG-RAN and the connection between the NG-RAN and the UE, respectively.

In step 302*d*, the UE may identify that the capability for 5G is indicated not to be used from the changed capability information included in the control message received from the NG-RAN in step 302*b*, and may transmit an RRC Release Response message to the NG-RAN so that it can be reported that the capability change has been successfully reflected. In addition, after transmitting the control message, the UE may release the connection with the 5G network and initiate a 4G network search procedure by configuring the capability for 5G to disable.

In step 302*e*, the NG-RAN may transfer a message reporting that the UE capability change has been successfully performed to the AMF.

Step 303 may be applied in a situation such as a case where a service provider changes UE capability through an application installed in the UE or a user changes capability through an environment configuration of the UE, etc., and a signal requesting UE capability change may be transferred to a terminal modem through an operating system of the UE, or the like.

In step 304, an operation of releasing the capability for 5G of the communication modem of the UE may be performed according to the capability change request according to step 303.

In step 305, the UE for which the capability for 5G has been released may search for available networks for communication. Here, in the case where a network to be accessed is designated in step 302 or there is a network with priority prestored in the UE, an operation of preferentially searching for a corresponding network may be performed. The illustrated example illustrates a case where the UE searches for a 4G network in the case where the capability for 50 is released and communication with the 5G network is disconnected.

In step 306*a*, the UE may perform a radio link setup process with an E-UTRAN (or a 4G base station, or an evolved node B; eNB) in order to proceed with an initial access to the 4G network identified through the search.

In step 306*b*, the UE may transmit an Attach Request message or a Tracking Area Update (TAU) Request message for initial access to the 4G network. The UE may include in the message a 'mobility from 5G' parameter, which is an indicator indicating that the UE has moved while communicating with the 5G network, and 'N1 mode disabled' information to indicate that the UE capability for 5G is temporarily suspended in the UE Capability parameter that transfers the UE capability information.

In step 307, a mobility management entity (MME) may determine that the UE capability for 5G is currently temporarily suspended from the 'N1 mode disabled' information received from the UE. In addition, the MME may store UE capability information in order to setup a session for the corresponding UE through PGW-C+SMF and PGW-U+UPF, for the preparation of the case where the UE capability for 5G is restored.

In step 308, the MME may identify the AMF accessed by the corresponding UE in the 5G network and transmit a control message (e.g., a UE Context Request message) requesting transfer of session information of the UE to the AMF. The control message may include UE identifier (e.g., globally unique temporary identity; GUTI) information received from the UE in step 306*b*, and the AMF may identify a previously accessed UE through the received GUTI information.

In step 309, the AMF may transmit a control message (for example, a PDU Session Context Request message) requesting session information of a corresponding UE to PGW-C+SMF.

In step 310, the PGW-C+SMF may request allocation of a Tunnel Endpoint IE (TEID) to be used when switching to 4G for each session of the corresponding UE to the PGW-U+UPF, and may receive the allocated TEID information.

In step 311, the PGW-C+SMF may transmit the control message (for example, a PDU Session Context Response message) including session information of the UE and TEID information for each session received from the PGW-U+UPF to the AMF. In this case, the session information of the UE may include Bearer ID information to be used in the 4G network corresponding to each 5G session and flow.

In step 312, the AMF may transfer the information received from the PGW-C+SMF to the MME.

In step 313, the MME may determine the number of 4G sessions that require setup from the received UE session information and transfer a Bearer ID and corresponding TEID information to a serving gateway (SGW) for session setup. The TEID used in this case may be a value allocated from PGW-U+UPF in step 310 and transferred to the MME.

In step 314, the SGW may allocate the TEID for each Bearer ID in order to setup a transmission path for each session for the corresponding UE and transmit the TEID to PGW-U+UPF through PGW-C+SMF.

In step 315, the SGW may receive a response message indicating that the data transmission path of the UE has been successfully set from the PGW-C+SMF.

In step 316, the SGW may report that the 4G session of the UE has been set by transferring a Create Session Response message to the MME. In this case, the SGW may transmit the control message including TEID information allocated for each Bearer ID in order to set the transmission path for communication with the E-UTRAN.

In step 317, the MME may transmit a control message (e.g., an Initial Context Setup Request message) for requesting a data transmission path setup of the UE between the E-UTRAN and the SGW to the E-UTRAN. The control message may include the TEID information allocated for each Bearer ID received from the SGW.

In step 318, the E-UTRAN may perform radio link setup with the UE for each Bearer ID through an RRC Reconfiguration procedure.

In step 319, the E-UTRAN may transmit a control message (e.g., an Update Session Request message) reporting that the radio link setup with the UE has been successfully completed to the MME. The control message may include the TEID allocated by the E-UTRAN for each Bearer ID.

In steps 320 and 321, the MME may transfer the TEID information for each Bearer ID received from the E-UTRAN to the SGW, and may receive a response message from the SGW in step 321.

In step 322, the MME may transmit a message (for example, an Update Session Response message) to notify that the data path setup in the SGW has been successfully completed to the E-UTRAN.

In step 323, the MME may transmit an Attach Accept message or a TAU Accept message to the UE through the E-UTRAN to notify that the network access requested by the UE has been successfully completed.

In step 324, the UE may transmit the Attach Complete or TAU Complete message reporting that the response message from the MME has been successfully received to the MME.

Figure 4:
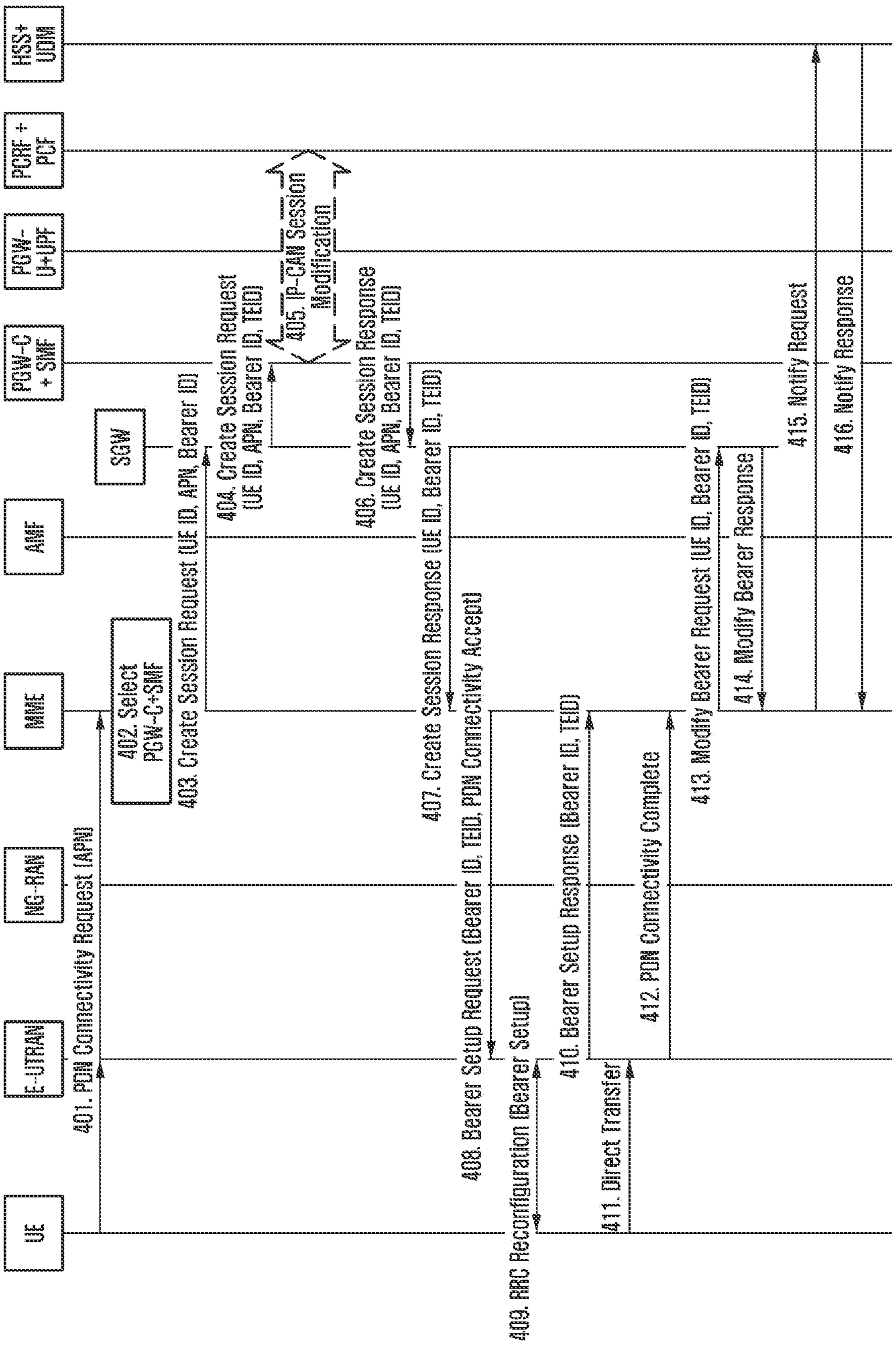
FIG. 4 is a sequence diagram illustrating a procedure for configuring a new session in a second network by a UE that has moved to the second network due to UE capability change according to an embodiment of the disclosure.

FIG. 4 is a sequence diagram illustrating a procedure for configuring a new session in a second network by a UE that has moved to the second network due to UE capability change according to an embodiment of the disclosure. This is for convenience of explanation, and depending on configurations and/or definitions on the system, not necessarily all of the steps described below must be included, and some steps may be omitted.

In step 401, the UE may transfer a message requesting a new session setup with the 4G network (for example, PDN Connectivity Request) to the MME through the E-UTRAN.

The message may include Access Point Name (APN) information specifying which data network the newly created session is connected to.

In step 402, the MME may identify that the UE that has requested a new session is a UE whose capability for 5G is temporarily suspended from the UE information stored in the MME in the process of performing the above-described access process in FIG. 3, and may select (determine) PGW-C+SMF capable of accepting the session setup request of the corresponding UE in the preparation for the case where the UE capability for 5G is restored in the future.

Through the process in steps 403 to 407, the MME, SGW, and PGW-C+SMF may perform session setup of the UE, and in this process, an IP Session Modification procedure may be performed in step 405 in order to receive a quality of service (QoS) policy to be applied to the session of the UE. In this process, unlike the case of creating a session for the UE supporting capability for 5G, the control message (e.g., a Create Session Response message) transferred from the PGW-C+SMF to the MME will not include 5G QoS information, and the same operation as creating a session for a general 4G UE may be performed.

In step 408, the MME may transmit a control message (e.g., a Bearer Setup Request message) requesting session and Bearer setup for the UE to the E-UTRAN. The control message may include a PDN Connectivity Accept message for transmission from the MME to the UE.

In step 409, the E-UTRAN may perform a radio link setup process necessary for the UE and each Bearer, and in this process, the PDN Connectivity Accept message received from the MME may be transferred to the UE.

In step 410, the E-UTRAN may transfer a message (e.g., a Bearer Setup Response message) reporting that the radio link setup process with the UE has been completed to the MME. The message may include the TEID information allocated by the E-UTRAN for each Bearer ID.

In steps 411 and 412, the UE may transmit a message reporting that the PDN Connectivity Accept message transferred by the MME has been successfully received (e.g., a PDN Connectivity Complete message) to the MME through the E-UTRAN.

In steps 413 and 414, the MME may transfer the TEID information for each Bearer received from the E-UTRAN to the SGW and receive a response message therefor, thereby completing data transmission path setup for the UE.

In step 415, the MME that has completed the data transmission path setup may report to HSS+UDM that a new session has been set for the UE.

In step 416, the MME may receive a response message to the report from HSS+UDM.

Figure 5A:
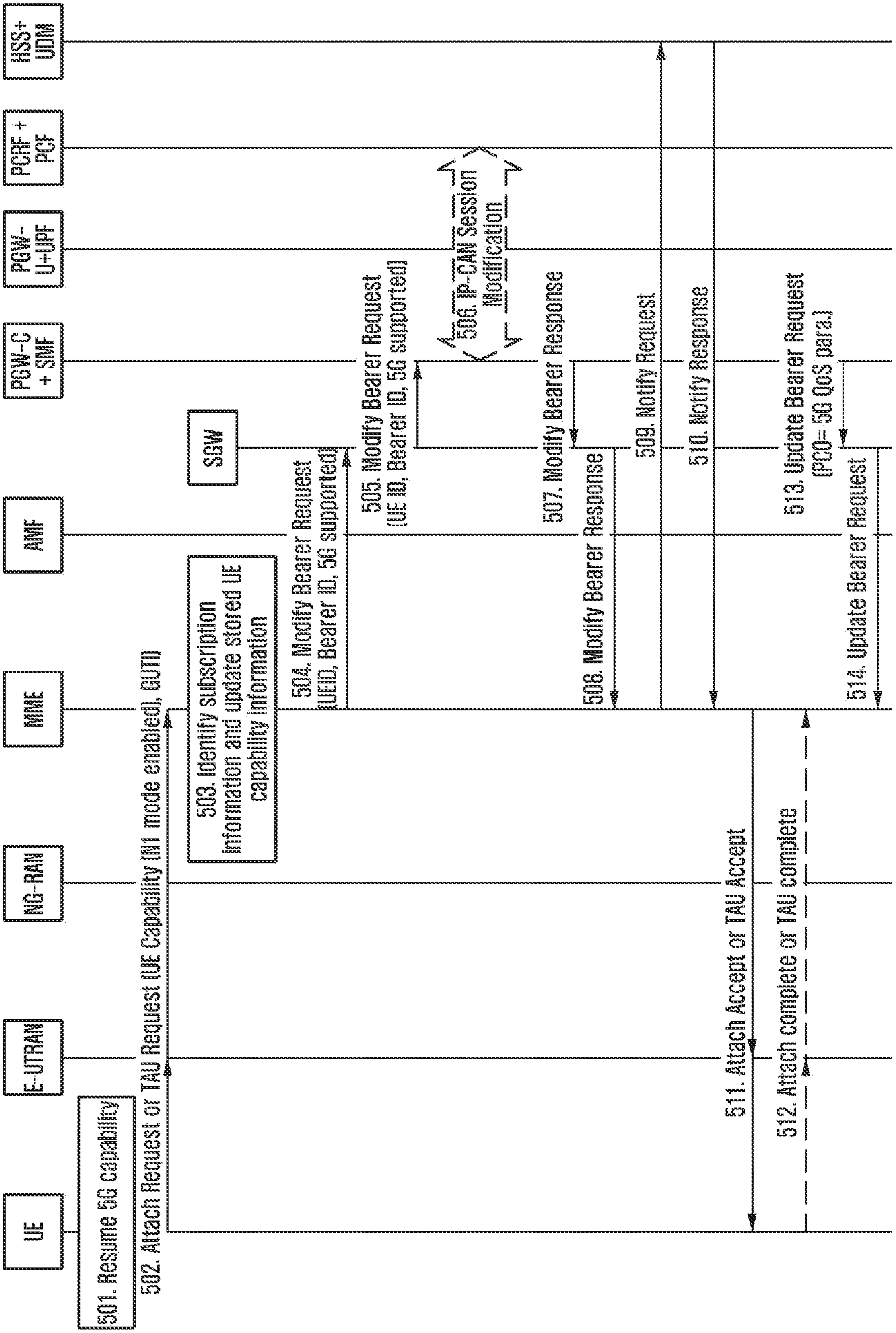
FIG. 5A is a sequence diagram illustrating a procedure for updating session information between a second network and a UE by initiating PGW-C+SMF in the case where the UE accesses the second network and restores UE capability for communication with a first network during communication according to an embodiment of the disclosure.
Figure 5B:
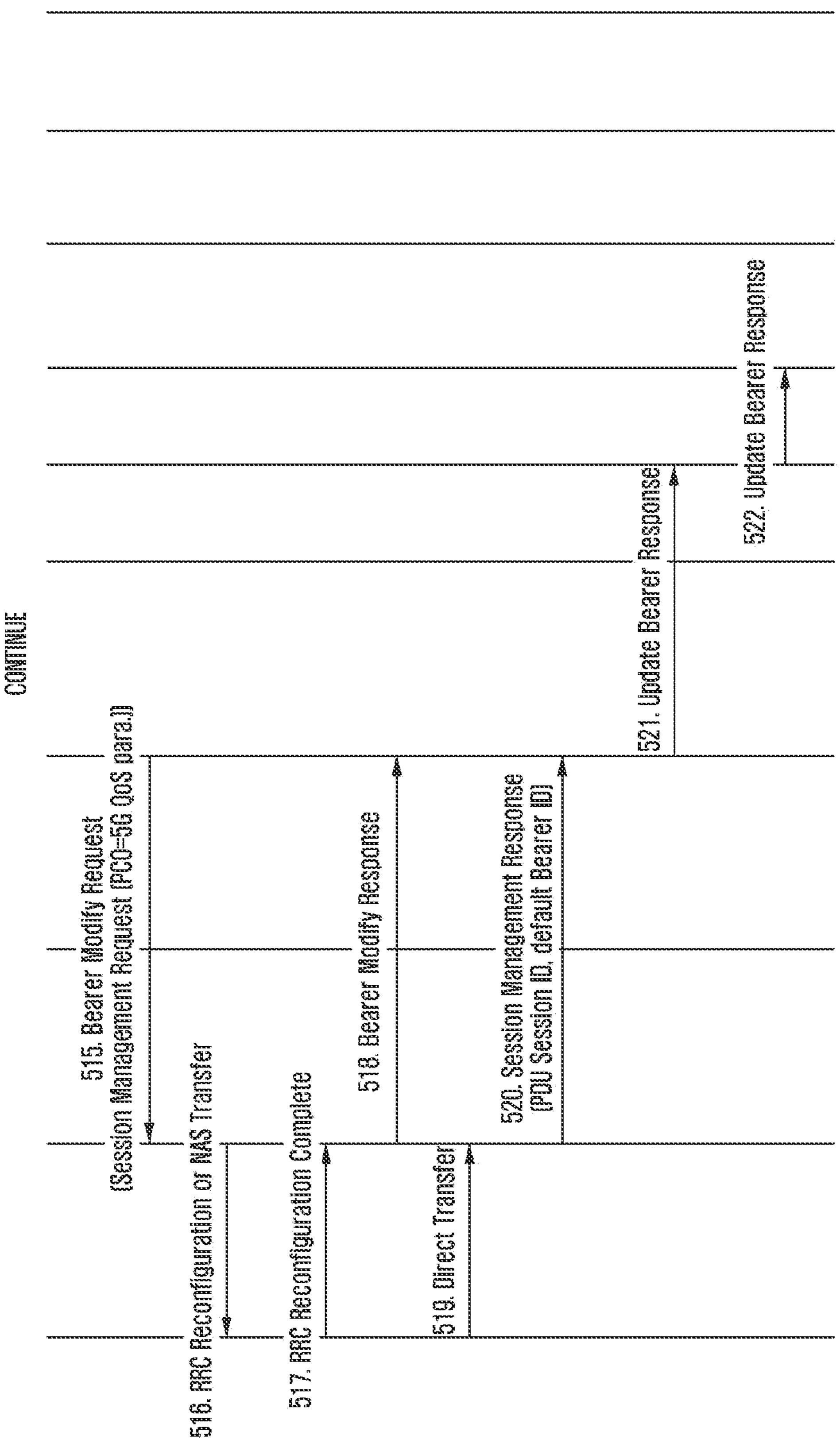
FIG. 5B is a sequence diagram illustrating a procedure for updating session information between a second network and a UE by initiating PGW-C+SMF in the case where the UE accesses the second network and restores UE capability for communication with a first network during communication according to an embodiment of the disclosure.

FIGS. 5A and 5B are sequence diagrams illustrating a procedure for updating session information between a second network and a UE by initiating PGW-C+SMF in the case where the UE accesses the second network and restores UE capability for communication with a first network during communication according to an embodiment of the disclosure. This is for convenience of explanation, and depending on configurations and/or definitions on the system, not necessarily all of the steps described below must be included, and some steps may be omitted.

In step 501, the UE may identify that capability change has occurred while connected to the 4G network. For example, capability for 5G may be re-enabled.

In step 502, a TAU Request message may be transferred to the MME via the E-UTRAN in order to report the changed UE capability to the network. Alternatively, according to an embodiment, instead of transmitting the TAU Request message, the current connection state may be released and the initial connection may be performed again. In this case, the UE capability information (for example, N1 mode enabled) may be included in an Attach Request message and transferred.

In step 503, the MME may determine whether the UE may access the 5G network by identifying that the UE capability for 5G is activated from the capability information received from the UE and identifying the stored UE subscription information. The MME may store the received updated UE capability information.

In step 504, in the case where it is determined that the UE can access the 5G network, the MME may transfer a control message (e.g., a Modify Bearer Request message) to the SGW. The control message may include information indicating that the UE capability for 5G is activated (e.g., '5G supported').

In step 505, the SGW may transfer at least one of information (e.g., UE ID, Bearer ID, TEID) received from the MME to the PGW-C+SMF.

In step 506, the PGW-C+SMF may perform policy and charging rules function (PCRF)+policy control function (PCF) and an IP-CAN Session Modification procedure as needed, and may receive policy information necessary for determining a 5G QoS parameter corresponding to each session or Bearer of the corresponding UE from the PCRF+PCF.

In steps 507 and 508, the PGW-C+SMF and the SGW may transmit a response message (e.g., a Bearer Modification Response message) notifying that Bearer modification has been successfully completed to the SGW and the MME, respectively.

In steps 509 and 510, the MME may transfer the updated UE capability information to HSS+UDM and receive a response message therefor from the HSS+UDM.

In step 511, the MME may transmit a TAU Accept message or an Attach Accept message to the UE as a response message corresponding to the TAU Request message or Attach Request message received from the UE to notify that the update of the capability information requested by the UE has been successfully completed.

In step 512, the UE may transmit a response message (e.g., a TAU complete message or an Attach complete message) corresponding to the TAU Accept message or Attach Accept message received from the MME to the MME.

In steps 513 and 514, the PGW-C+SMF may transmit an Update Bearer Request message to the MME via the SGW to transfer a 5G QoS parameter corresponding to each Bearer to the UE. The Update Bearer Request message includes Protocol Configuration Option (PCO) information, and the 5G QoS parameter may be included in the PCO information and transferred. The PGW-C+SMF may determine whether a Bearer change procedure for transferring the 5G QoS parameter is required from the updated UE capability information received in step 505.

In step 515, the MME may transmit a Bearer Modify Request message including a Session Management Request message to the E-UTRAN. The Session Management Request message may include the 5G QoS parameter received from the PGW-C+SMF.

In step 516, the E-UTRAN may perform a necessary radio link setup process with the UE according to the request of the MME, and in this process, the Session Management Request message received from the MME may be transmitted to the UE.

In steps 517 and 518, the UE and the E-UTRAN may transmit a response message indicating that the requested Bearer change has been successfully completed to the E-UTRAN and the MME, respectively.

In step 519, the UE may transmit the Session Management Response message to the MME via the E-UTRAN using a Direct Transfer message. The Session Management Response message may include PDU Session ID information corresponding to each Bearer ID for which the UE has received the 5G QoS parameter in step 516.

In step 520, the E-UTRAN may transfer the Session Management Response message received from the UE to the MME.

In steps 521 and 522, the MME may transmit the PDU Session ID information corresponding to each Bearer ID received in step 520 to the PGW-C+SMF via the SGW. The PGW-C+SMF stores the received PDU Session ID and Bearer ID mapping information, and may use it as information constituting the 5G session corresponding to each Bearer of the 4G network in the case where the UE moves to the 5G network in the future.

Figure 6A:
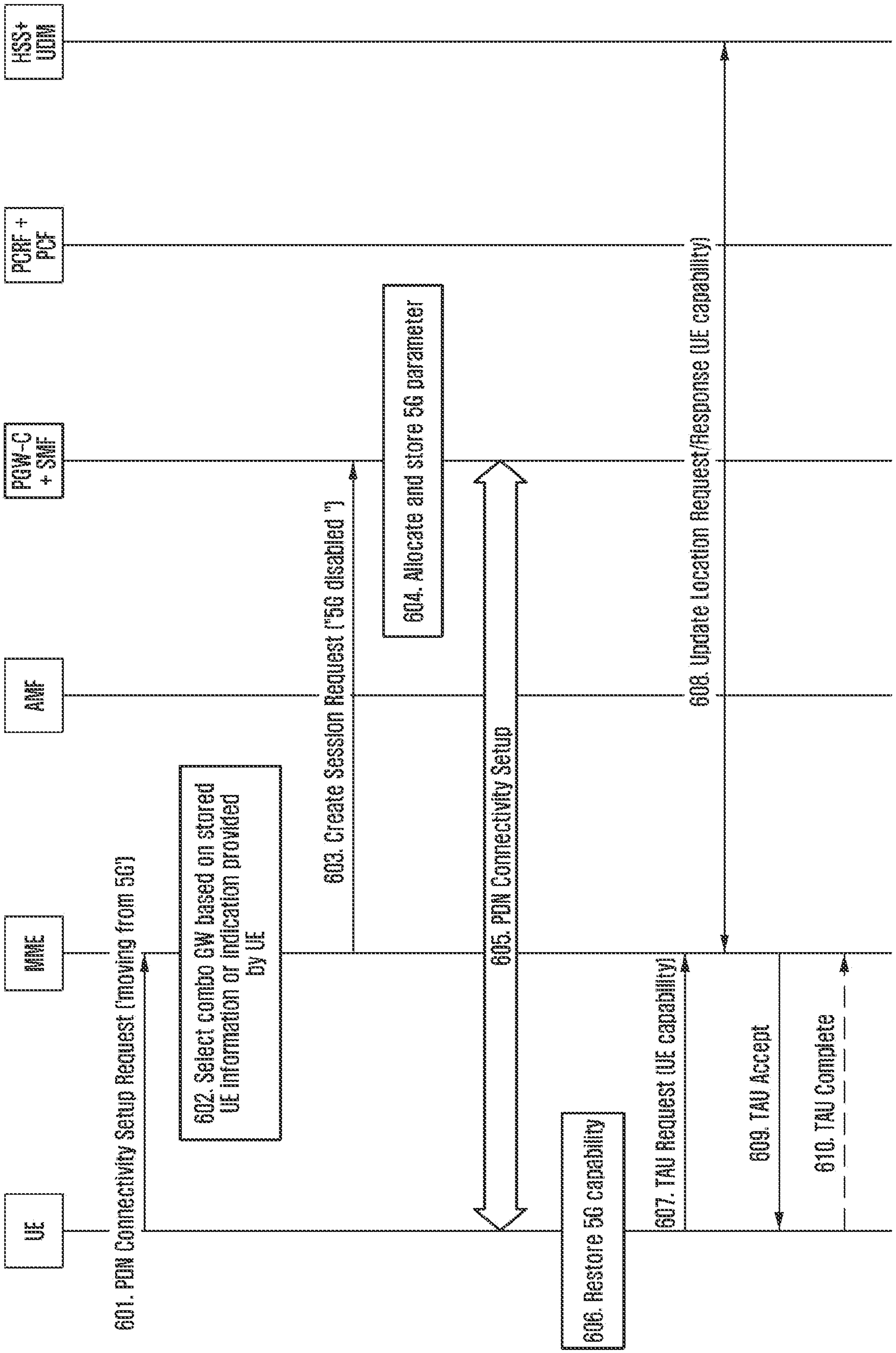
FIG. 6A is a sequence diagrams illustrating a procedure for updating session information between a second network and a UE by initiating PCRF+PCF in the case where the UE accesses the second network and restores UE capability to communicate with a first network during communication.
Figure 6B:
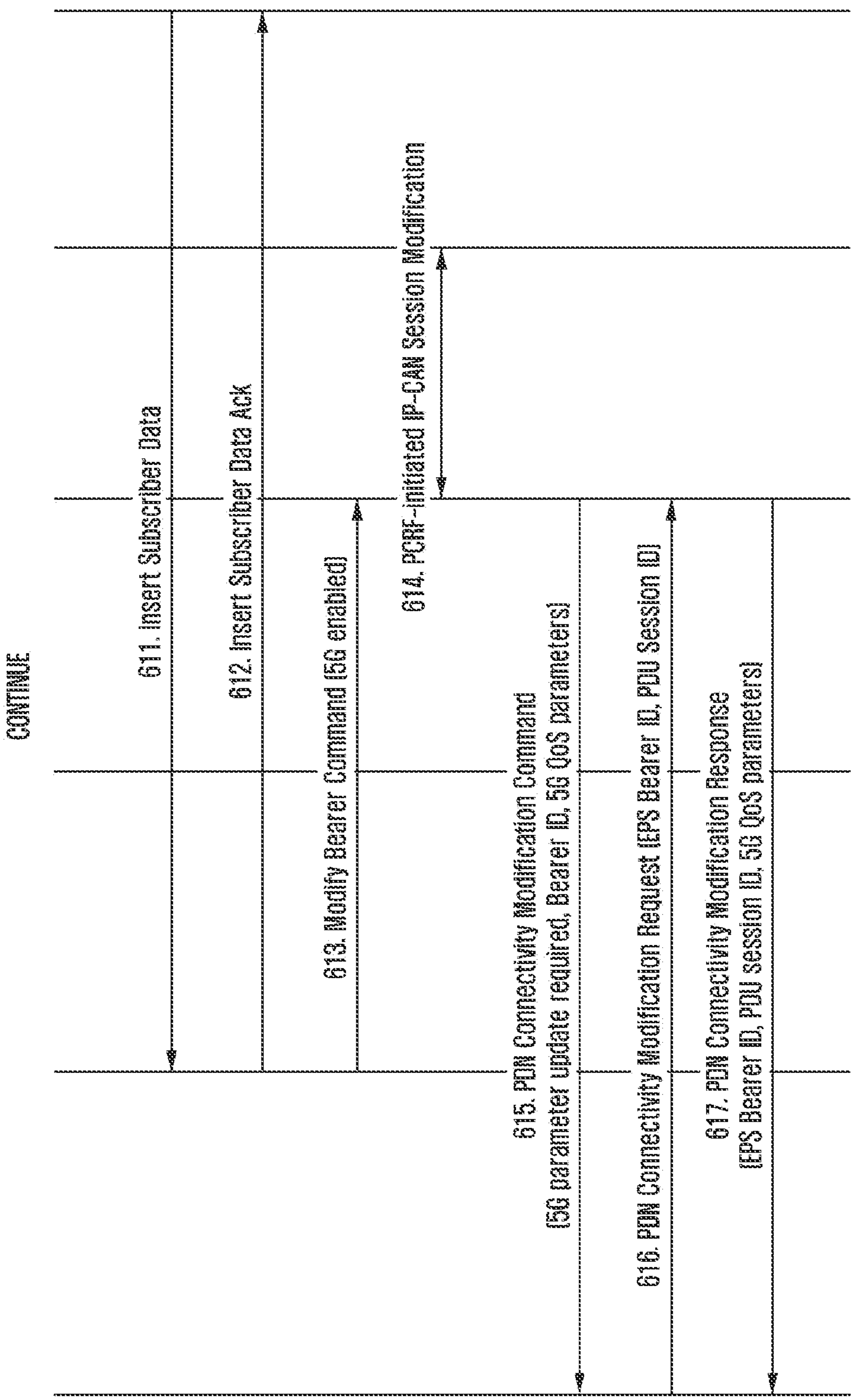
FIG. 6B is a sequence diagrams illustrating a procedure for updating session information between a second network and a UE by initiating PCRF+PCF in the case where the UE accesses the second network and restores UE capability to communicate with a first network during communication.

FIGS. 6A and 6B are sequence diagrams illustrating a procedure for updating session information between a second network and a UE by initiating PCRF+PCF in the case where the UE accesses the second network and restores UE capability to communicate with a first network during communication. This is for convenience of explanation, and depending on configurations and/or definitions on the system, not necessarily all of the steps described below must be included, and some steps may be omitted.

In step 601, the UE may transmit a PDN connectivity setup request message (e.g., PDN Connectivity Setup Request message) to the MME in order to request a new session. The UE may include information indicating that the UE has moved from the 5G network (e.g., 'moving from 5G') in the message.

In step 602, the MME may identify the stored UE information and select a suitable PGW for the session setup request of the UE. In this case, the MME may determine that the UE capability for 5G is currently temporarily suspended from the UE information stored for the UE. In preparation for the case where the UE capability is restored and the UE moves to the 5G network, instead of selecting a general PGW that supports only 4G-only terminals for session setup for the UE, a PGW-C+SMF capable of supporting capability for 4G and 5G may be selected. Alternatively, according to an embodiment, in the case where the UE transmits the 'moving from 5G' indicator through the PDN Connectivity Setup Request message in step 601 described above, it is determined that the UE capability for 5G is temporarily suspended based on the stored UE capability information and the received indicator information, and the operation for allocating the PGW-C+SMF may be performed.

In step 603, the MME may transmit a message (e.g., Create Session Request message) requesting a new session setup for the UE to the PGW-C+SMF selected in step 602 described above. Also, although not illustrated, a control message transferred from the MME to the PGW-C+SMF may be transferred to the PGW-C+SMF through the SGW. The MME may include information (e.g., '5G disabled') indicating that the UE requesting a new session setup is a UE capable of supporting 5G capability in the future in the Create Session Request message.

In step 604, the PGW-C+SMF receiving the request for session creation for the UE from the MME may perform a process of setting a new session with the PGW-U+UPF for the UE. In this process, the PGW-C+SMF may determine that the UE is likely to move to the 5G network in the future from the '5G disabled' indicator received from the MME, and the 5G QoS parameter necessary to maintain the session when the UE moves to the 5G network, network slice information (single-network slice selection assistance information; S-NSSAI), and the like may be pre-allocated and stored in a session creation process. For the process of allocating the 5G parameter, various methods, such as pre-allocating the 50 parameter in the process of creating a session in the current step according to an embodiment, or allocating the 5G parameter in the process of updating the session after UE capability change is actually reported, may be applied, in terms of identifying UE capability and allocating the 5G parameter. The 5G parameters allocated by the PGW-C+SMF may not be transferred to the MME in this step and may be stored internally in the PGW-C+SMF.

In step 605, the PDN Connectivity Setup procedure of the 4G network between the MME, the E-UTRAN, and the UE may be performed, starting with the transmission of a response message reporting that the session requested by the UE has been successfully created from the PGW-C+SMF to the MME. In this case, in the signaling procedure for the PDN Connectivity Setup, the parameters related to the 5G network may not be transmitted, and procedures for creating a general 4G network session may be performed.

In step 606, the interrupted UE capability for 5G may be restored. For example, the 5G capability may be restored by a user configuration, a signal through a separate application of a communication service provider, or a separate delay time received by the UE while the capability for 5G is suspended.

In step 607, the UE may transmit a message for reporting the changed capability to the network (e.g., a TAU Request message) to the MME. The message may include changed UE capability information.

In step 608, the MME may identify the updated UE capability information from the TAU Request message transmitted by the UE and transmit the UE capability information to the HSS+UDM. The HSS+UDM may store the UE capability information transmitted by the MME and transmit a response message to the MME.

In step 609, the MME may transmit a TAU Accept message to the UE to notify that the UE capability information transmitted by the UE has been successfully received from the network.

In step 610, in the case where the MME requests a response, the UE may transmit a TAU Complete message to the MME and report that the TAU Accept message transferred by the MME has been successfully received.

Steps 611 to 613 represent signaling procedures that can occur in the case where the HSS+UDM receives the updated UE capability information in step 608 and then requests a session change of the UE by applying a subscriber policy according to the UE subscription information.

In step 611, the HSS+UDM may transmit an Insert Subscriber Data message including subscription information to be newly applied to the UE to the MME by reflecting the UE capability change.

In step 612, the MME may transmit a response message identifying that the message transmitted by the HSS+UDM in step 611 has been successfully received to the HSS+UDM.

In step 613, the MME may transmit a message (e.g., a Modify Bearer Command message) for changing the session of the UE by applying the new subscription information transferred by the HSS+UDM to the PGW-C+SMF. The message may include information indicating that the UE capability for 5G has been restored (e.g., '5G enabled'). The above process from step 611 to step 613 is a procedure performed in the case where the session change of the UE is initiated by the HSS+UDM when the UE capability update occurs, and may be omitted in the case where the session change of the UE is initiated by another network capability.

Step 614 may be performed in the case where a session change is initiated by the PCRF+PCF. In step 608, when the updated UE capability information is transferred to the HSS+UDM by the MME, the HSS+UDM may store the updated UE capability information in a unified data repository (UDR). The PCRF+PCF may determine whether the session change of the UE is required from the UE capability information stored in the unified data storage in preparation for UE movement to the 5G network. The PCRF+PCF may select sessions or bearers for which continuity should be provided when moving to the 5G network for each session of the UE, and may configure a new QoS policy so that the 5G parameter information can be updated between the UE and the network for the sessions and bearers and transfer the configured information to the PGW-C+SMF. In this case, instead of using new QoS policy information, the transferred parameter may be in the form of an indicator simply indicating 5G parameter update for each corresponding session and Bearer.

In step 615, the PGW-C+SMF may determine whether 5G parameter update with the UE is necessary from the control message received in step 613 or step 614, and may transmit a PDN Connectivity Modification Command message via the MME and the E-UTRAN to initiate the PDN Connectivity Modification process with the UE. The message may include at least one of a bearer ID for which 5G parameter update is required, 5G QoS parameters corresponding thereto, and information indicating that 5G parameter update is required for the UE (e.g., '5G parameter update required').

In step 616, the UE may identify that each Bearer ID and corresponding 5G Qos parameters are included in the received message, and determine whether 5G session information needs to be updated for each Bearer ID. The UE may additionally store received 5G QoS parameters in session information stored in the UE for each bearer ID. The UE may allocate one PDU Session ID to the Default Bearer of each session in preparation for movement to the 5G network and store mapping information between the Default Bearer ID and the PDU Session ID. According to an embodiment, in the case where the '5G parameter update required' indicator is used, the UE may determine whether 5G parameter update and PDU Session ID allocation are necessary by referring to the indicator. In the case where the indicator is not used, the UE may determine that PDU Session ID allocation is necessary based on the fact that 5G QoS parameters are received for a Default Bearer to which 5G QoS parameters are not previously allocated. After updating each stored Bearer information using the received 5G QoS parameters for each received Bearer ID, the UE may transmit a PDN Connectivity Modification Request message to the PGW-C+SMF through E-UTRAN and MME. Through this, it is possible to report that session information in the UE has been updated and to request update of session information in the corresponding network. The message may include mapping information of the above-described Default Bearer ID and PDU Session ID.

In step 617, the PGW-C+SMF may transmit a PDN Connectivity Modification Response message to the UE to notify that session information has been updated in the network. According to an embodiment, instead of storing the mapping information between the bearer ID and the 5G QoS parameter in step 616, the UE may store the mapping information after receiving the PDN Connectivity Modification Response in step 617.

Figure 7:
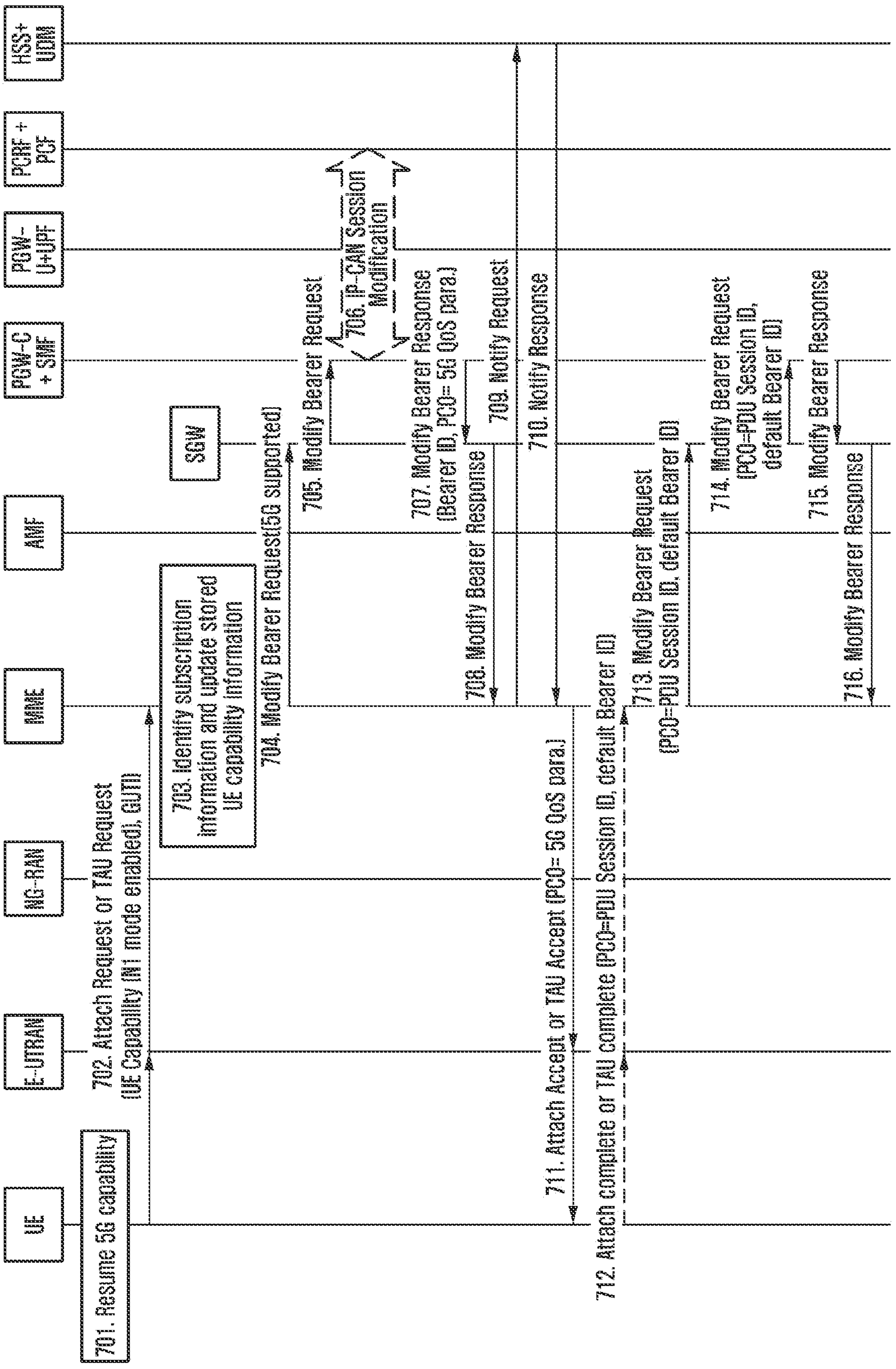
FIG. 7 is a sequence diagram illustrating a procedure for updating session information between a second network and a UE by initiation of a MME in the case where the UE accesses the second network and restores UE capability for communication with a first network during communication according to an embodiment of the present disclosure.

FIG. 7 is a sequence diagram illustrating a procedure for updating session information between a second network and a UE by initiation of a MME in the case where the UE accesses the second network and restores UE capability for communication with a first network during communication according to an embodiment of the present disclosure. This is for convenience of explanation, and depending on configurations and/or definitions on the system, not necessarily all of the steps described below must be included, and some steps may be omitted.

In step 701, the UE may identify that capability change has occurred while connected to the 4G network. For example, 5G capability may be re-enabled.

In step 702, the UE may transmit a TAU Request message to the MME via the E-UTRAN in order to report to the network that capability change has occurred. Alternatively, according to an embodiment, instead of transmitting the TAU Request message, the current connection state may be released and an initial connection may be performed again. In this case, the Attach Request message may include UE capability information and be transmitted. The message may include updated UE capability information.

In step 703, the MME may determine whether the UE can access the 5G network by identifying that the UE capability for 5G is activated from the capability information received from the UE and identifying the stored UE subscription information. The MME may store the received updated UE capability information in order to determine whether the UE supports the 5G network when requesting a handover to the UE session and the 5G network in the future.

In step 704, the MME may transmit a control message (e.g., a Modify Bearer Request message) to the SGW in the case where it is determined that the UE can access the 5G network. The control message may include information indicating that the UE capability for 5G is activated (e.g., '5G supported').

In step 705, the SGW may transfer the information received from the MME to PGW-C+SMF.

In step 706, the PGW-C+SMF may perform the IP-CAN Session Modification procedure with the PCRF+PCF as necessary and may receive policy information necessary for determining the 5G QoS parameter corresponding to each session or Bearer of the corresponding UE from the PCRF+PCF.

In steps 707 and 708, the PGW-C+SMF and the SGW may transmit a response message (for example, a Modify Bearer Response message) notifying that Bearer Modification has been successfully completed to the SGW and the MME, respectively. In step 707, the PGW-C+SMF may determine the Bearer IDs requiring 5G QoS parameter update and the 5G parameters to be applied to them by using the policy information for 5G QoS received from the PCRF+PCF and the service provider's policy stored inside the PGW-C+SMF, in preparation for movement to the 5G network. In addition, the PGW-C+SMF may store the 5G QoS parameters corresponding to each Bearer ID in the Protocol Configuration Option (PCO) field inside the Modify Bearer Request message and transmit them to the SGW. In step 708, the SGW may transfer the received message to the MME.

In steps 709 and 710, the MME may transfer the updated UE capability information to the HSS+UDM and receive a response message therefor from the HSS+UDM.

In step 711, the MME may transmit a TAU Accept message or an Attach Accept message to the UE as a response message corresponding to the TAU Request message or Attach Request message received from the UE to notify that the capability information update requested by the UE has been successfully completed. The TAU Accept message and Attach Accept message may include the PCO information including the 5G QoS parameters corresponding to each Bearer ID received by the MME from the SGW in step 708.

In step 712, the UE may transmit a TAU Complete message or an Access Complete message corresponding to the TAU Accept message or Attach Accept message received from the MME to the MME. The TAU Complete or Access Complete message may include PDU Session ID information allocated by the UE for Default Bearers of each session among Bearers for which update of 5G QoS parameters included in the PCO field of the message received in step 711 is requested. For example, in step 712, the UE may allocate one PDU Session ID for each Default Bearer whose 5G parameters are updated, and store the mapping information between {Default Bearer ID, PDU Session ID} inside the UE, and then, transmit the mapping information to the MME by including the information in the above message in preparation for moving to the 5G network.

In step 713, the MME may transmit PDU Session ID information corresponding to each Default Bearer ID received from the UE to the SGW.

In step 714, the SGW may transmit the information received in step 713 to the PGW-C+SMF.

The PGW-C+SMF may store the received PDU Session ID and the Default Bearer ID mapping information, and may use them as information constituting the 5G PDU session corresponding to each PDN Connection in the 4G network represented by the Default Bearer ID in the case where the UE moves to the 5G network in the future.

In steps 715 and 716, the PGW-C+SMF and the SGW may report that the session information for the UE has been successfully updated to the SGW and the MME, respectively.

Figure 8A:
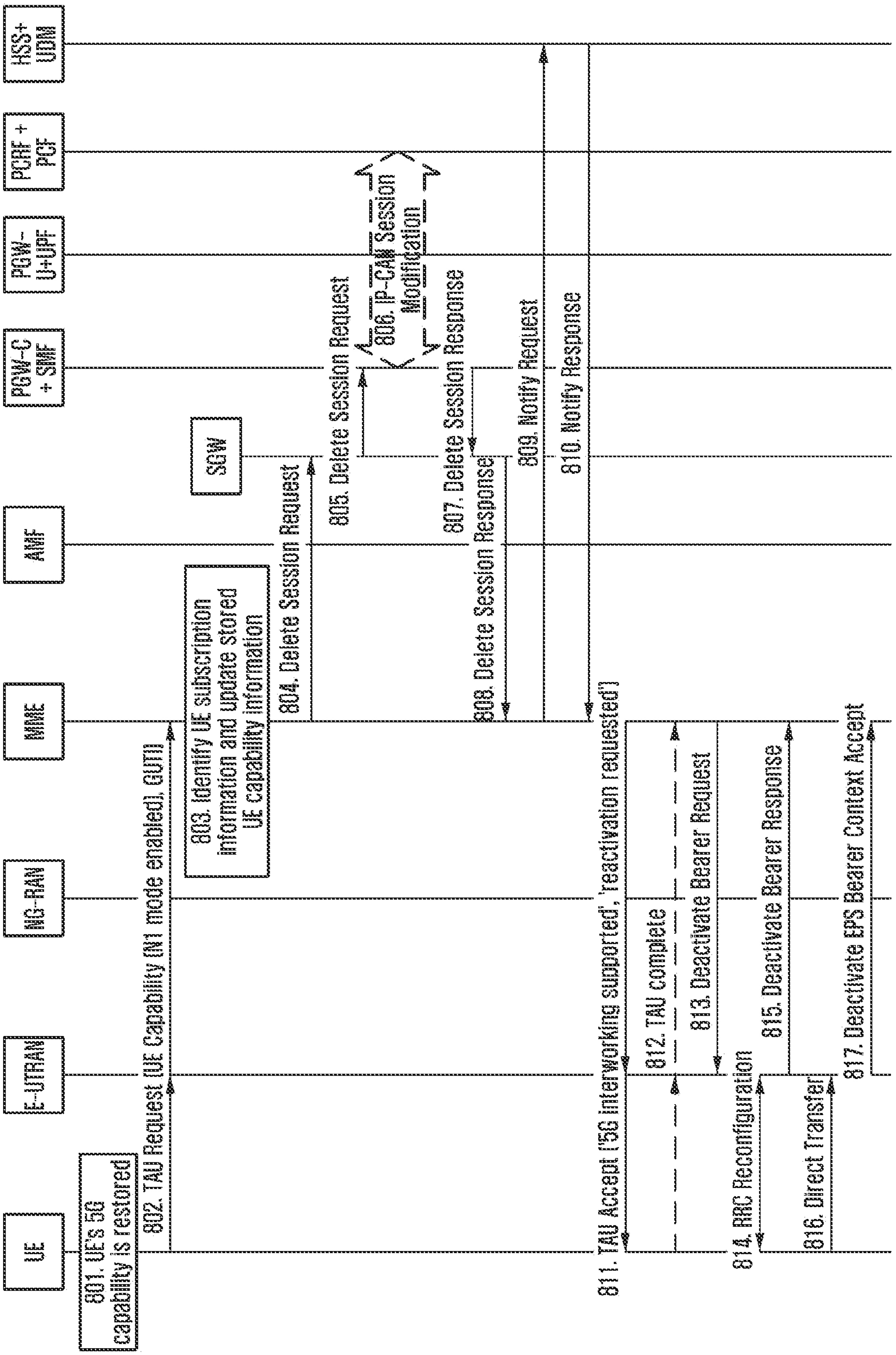
FIG. 8A is a sequence diagram illustrating a procedure for resetting session of UE by initiation of MME in the case where the UE assesses a second network and restores UE capability for communication to a first network during communication according to an embodiment of the disclosure.
Figure 8B:
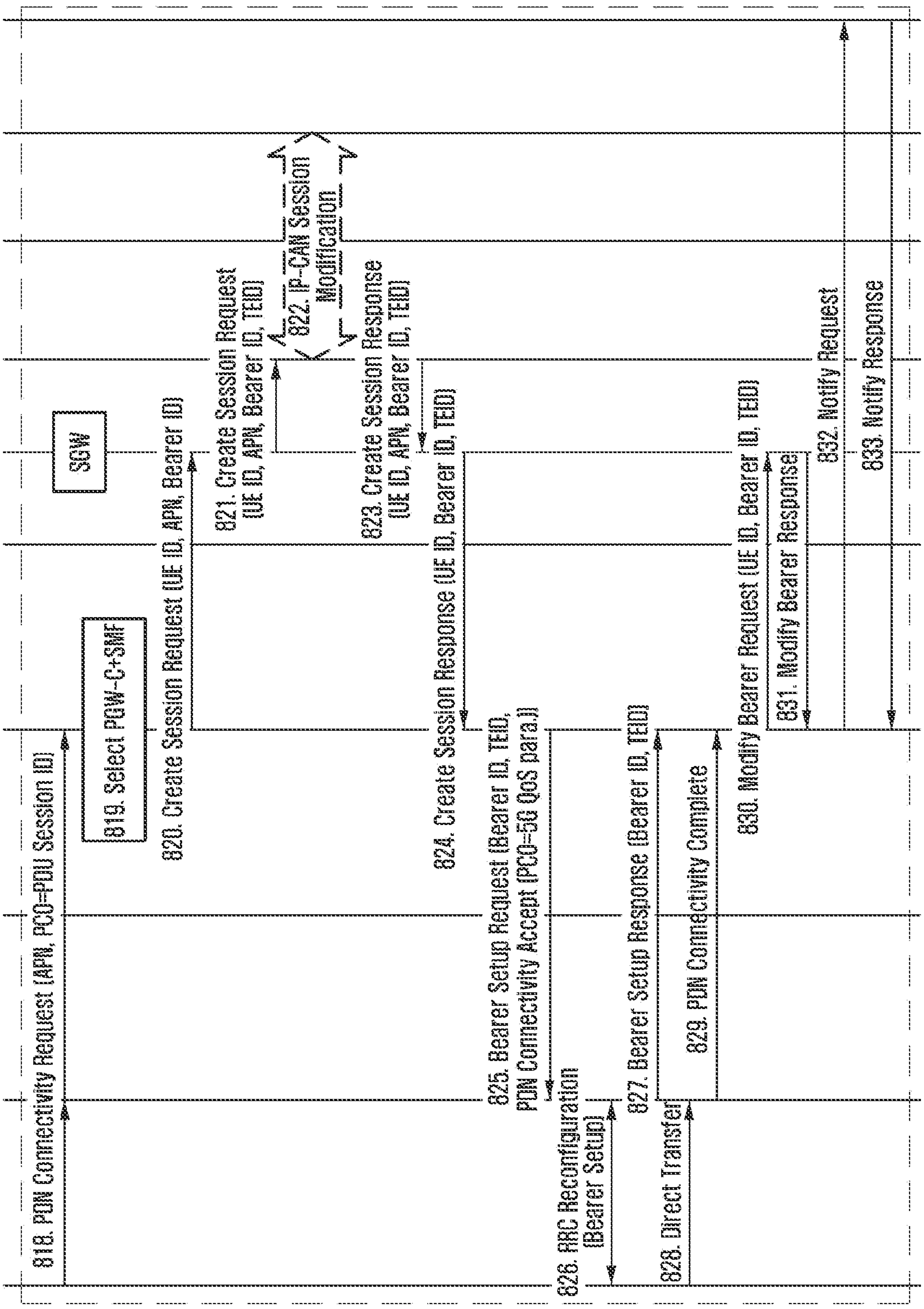
FIG. 8B is a sequence diagram illustrating a procedure for resetting session of UE by initiation of MME in the case where the UE assesses a second network and restores UE capability for communication to a first network during communication according to an embodiment of the disclosure.

FIGS. 8A and 8B are sequence diagrams illustrating a procedure for resetting session of UE by initiation of MME in the case where the UE assesses a second network and restores UE capability for communication to a first network during communication according to an embodiment of the disclosure. This is for convenience of explanation, and depending on configurations and/or definitions on the system, not necessarily all of the steps described below must be included, and some steps may be omitted.

A procedure similar to that described through steps 501 to 510 in FIG. 5 and the corresponding description may be applied to the process of steps 801 to 810.

Specifically, in step 801, the UE may identify that capability change has occurred in a situation in which the UE is connected to a 4G network. For example, 5G capability may be re-enabled.

In step 802, a TAU Request message may be transmitted to the MME via the E-UTRAN in order to report the changed UE capability to the network. Alternatively, according to an embodiment, instead of transmitting the TAU Request message, the current connection state may be released and the initial connection may be performed again. In this case, the UE capability information (for example, N1 mode enabled) may be included in the Attach Request message and transferred.

In step 803, the MME may determine whether the UE can access the 5G network by identifying that the UE capability for 5G is activated from the capability information received from the UE and identifying the stored UE subscription information. The MME may store the received updated UE capability information.

In step 804, in the case where it is identified that the UE can access the 5G network, the MME may transmit a session deletion request message (e.g., a Delete session Request message) to the SGW.

In step 805, the SGW may transmit a Delete session Request message to the PGW-C+SMF.

In step 806, the PGW-C+SMF may perform the IP-CAN Session Modification procedure with the PCRF+PCF as necessary and may receive policy information necessary for determining the 5G QoS parameter corresponding to each session or Bearer of the corresponding UE from the PCRF+PCF.

In steps 807 and 808, the PGW-C+SMF and the SGW may transmit a response message (for example, a Delete Session Response message) notifying that the session deletion has been successfully completed to the SGW and the MME, respectively.

In steps 809 and 810, the MME may transfer the updated UE capability information to the HSS+UDM and receive a response message therefor from the HSS+UDM.

In step 811, since the updated UE capability is applied and the movement of the UE to the 5G network is allowed, the MME may include indicator information requesting reconfiguration of the connection with the network in the TAU Accept message and transmit the message to the UE.

In step 812, the UE may report that the TAU Accept transferred by the MME has been successfully processed by transmitting a TAU Complete message to the MME.

Steps 813 to 817 are procedures in which the MME requests the UE to release all sessions of the UE, and according to an embodiment, the procedures may be applied instead of the UE itself releasing the session, or may be applied in the case where the UE's session release is not initiated even after a certain period of time. For example, in steps 813 to 815, the MME and the UE may transmit and receive a Deactive Bearer Request message and a Deactive Bearer Response message through an RRC Reconfiguration procedure between the UE and the E-UTRAN. In step 816, a Deactivate EPS Bearer Context Accept message may be transmitted to the MME via the E-UTRAN using a Direct Transfer message. In step 817, the E-UTRAN may transmit the Deactivate EPS Bearer Context Accept message received from the UE to the MME.

In step 818, the UE may release all sessions by itself or at the request of the MME according to the procedures of steps 813 to 817, and then may transmit a PDN Connectivity Request message for each session to the MME to reset the session. In this case, since the 5G capability is activated, the PDU Session ID allocated by the UE may be included in the message to request the allocation of 5G QoS parameters in preparation for movement to the 5G network.

Hereinafter, in steps 819 to 833, procedures for setting a PDN Connection between the UE and the network may be performed. For example, the UE may transmit the PDN Connectivity Request message to the MME through the E-UTRAN, and the MME may select the PGW-C+SMF from stored UE information. The MME, the SGW, and the PGW-C+SMF may perform session setup of the UE, and in this process, may perform the IP Session Modification procedure.

Specifically, in step 820, the MME may transmit a Create Session Request message including UE ID, APN, and Bearer ID to the SGW. In step 821, the SGW may transmit the Create Session Request message including UE ID, APN, Bearer ID, and TEID to the PGW-C+SMF. In step 822, the PGW-C+SMF may perform an IP-CAN Session Modification procedure with the PCRF+PCF, and may receive policy information necessary for determining 5G QoS parameters corresponding to each session or Bearer of the corresponding UE from the PCRF+PCF. In step 823, the PGW-C+SMF may transmit a Create Session Response message including UE ID, APN, Bearer ID, and TEID to the SGW. In step 824, the SGW may transmit the Create Session Response message including UE ID, Bearer ID, and TEID to the MME. The MME may transmit a Bearer Setup Request message to the E-UTRAN. The E-UTRAN may perform the necessary radio link setup process for the UE and each Bearer, and during this process, the PDN Connectivity Accept message received from the MME may be delivered to the UE. The E-UTRAN may transfer a Bearer Setup Response message to the MME. The message may include TEID information allocated by the E-UTRAN for each Bearer ID. The UE may transfer the PDN Connectivity Complete message to the MME through the E-UTRAN. Thereafter, the MME may complete the data transmission route setup for the UE by transferring the TEID information for each bearer received from the E-UTRAN to the SGW, and the MME that has completed the data transmission route setup may report to the HSS+UDM that a new session has been set for the UE, and may receive a response message therefore.

Among the above-described embodiments in the disclosure, respective constitutions, information, or steps may be selectively joined/combined and applied.

Figure 9:
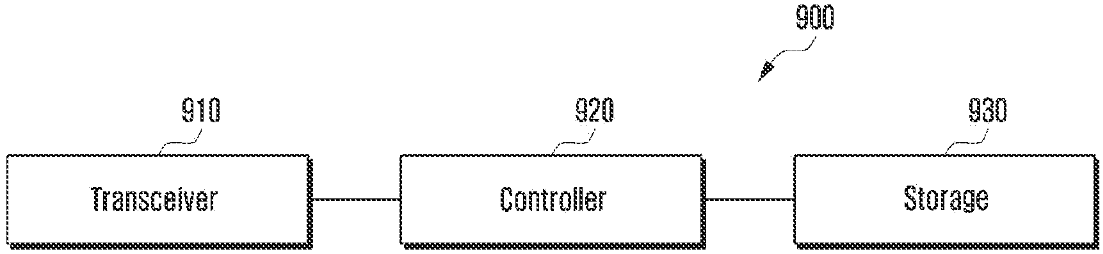
FIG. 9 is a diagram illustrating a structure of a UE according to an embodiment of the disclosure.

FIG. 9 is a diagram illustrating a structure of a UE according to an embodiment of the disclosure.

With reference to FIG. 9, a UE may include a transceiver 910, a controller 920, and a storage 930. In the disclosure, the controller may be defined as a circuit, an application-specific integrated circuit, or at least one processor.

The transceiver 910 may transmit/receive a signal to/from a base station or other network entity.

For example, the transceiver 910 may receive system information from a base station and receive a synchronization signal or a reference signal. In addition, the transceiver 910 may transmit/receive information or a control message to/from other network entity.

The controller 920 may control the overall operation of the UE according to embodiments proposed in the disclosure. For example, the controller 920 may control a signal flow between blocks to perform operations according to the above-described embodiments. Specifically, in an environment in which the UE according to an embodiment of the disclosure communicates through 4G and 5G wireless communication systems, the controller 920 may control operations proposed in the disclosure so that the data session of the UE can be maintained without being disconnected even in the case where UE capability change occurs and the connected wireless communication system is changed.

The storage 930 may store at least one of information transmitted/received through the transceiver 910 and information generated through the controller 920. For example, the storage 930 may store UE capability information related to the network of the UE.

Figure 10:
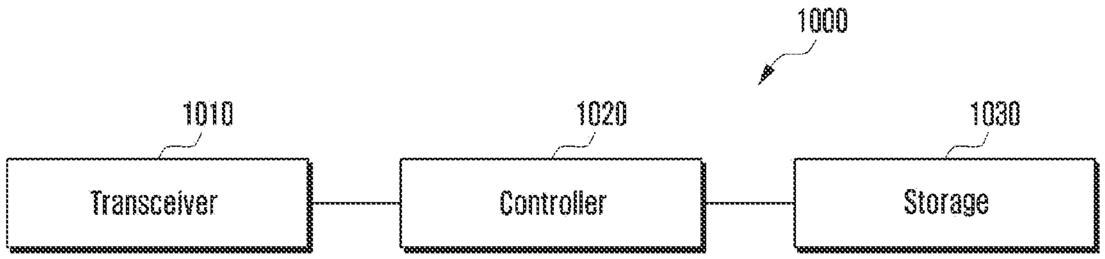
FIG. 10 is a diagram illustrating a structure of a base station according to an embodiment of the disclosure.

FIG. 10 is a diagram illustrating a structure of a base station according to an embodiment of the disclosure.

With reference to FIG. 10, a base station may include a transceiver 1010, a controller 1020, and a storage 1030. In the disclosure, the controller may be defined as a circuit, an application-specific integrated circuit, or at least one processor.

The transceiver 1010 may transmit/receive a signal to/from a terminal or other network entity.

For example, the transceiver 1010 may transmit system information to the UE and may transmit a synchronization signal or a reference signal to the UE. Also, the transceiver 1010 may transmit/receive information or a control message to/from other network entity.

The controller 1020 may control the overall operation of the base station according to embodiments proposed in the disclosure. For example, the controller 1020 may control a signal flow between blocks to perform operations according to the above-described embodiments.

Specifically, in an environment in which the UE according to an embodiment of the disclosure communicates through 4G and 5G wireless communication systems, the controller 1020 may control operations proposed in the disclosure so that the data session of the UE can be maintained without being disconnected even in the case where UE capability change occurs and the connected wireless communication system is changed.

The storage 1030 may store at least one of information transmitted/received through the transceiver 1010 and information generated through the controller 1020. For example, the storage 1030 may store UE capability information related to the network.

Figure 11:
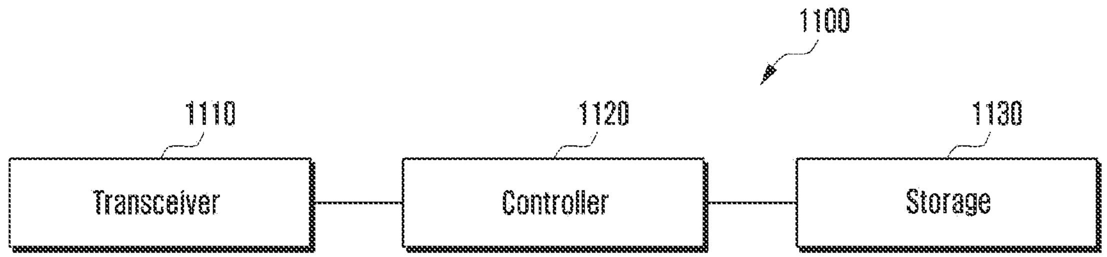
FIG. 11 is a diagram illustrating a structure of a network entity according to an embodiment of the disclosure.

FIG. 11 is a diagram illustrating a structure of network entities according to an embodiment of the disclosure.

With reference to FIG. 11, a network entity may include a transceiver 1110, a controller 1120, and a storage 1130. In the disclosure, the controller may be defined as a circuit, an application-specific integrated circuit, or at least one processor.

The transceiver 1110 may transmit/receive a signal to/from a terminal, a base station or other network entity. For example, the transceiver 1110 may transmit/receive information or a control message to/from other network entity.

The controller 1120 may control the overall operation of the UE according to embodiments proposed in the disclosure. For example, the controller 1120 may control a signal flow between blocks to perform operations according to the above-described embodiments. Specifically, in an environment in which the UE according to an embodiment of the disclosure communicates through 4G and 5G wireless communication systems, the controller 1120 may control operations proposed in the disclosure so that the data session of the UE can be maintained without being disconnected even in the case where UE capability change occurs and the connected wireless communication system is changed.

The storage 1130 may store at least one of information transmitted/received through the transceiver 1110 and information generated through the controller 1120. For example, the storage 1130 may store UE capability information related to a network or UE's subscription information.

In the specific embodiments of the disclosure described above, the components included in the disclosure have been expressed in the singular or plural form according to the suggested embodiments of the disclosure. However, the expression in the singular or plural form is appropriately selected according to the suggested situations for convenience of explanation and is not intended to limit the disclosure to the single or plural components, and even when a certain component is expressed in the plural form, it may be provided with a single component, and even when a certain component is expressed in the singular form, it may be provided with a plurality of components.

Meanwhile, the embodiments of the disclosure disclosed in the present specification and the drawings are only particular examples for clearly describing the technical aspects of the disclosure and helping understanding of the disclosure, and are not intended to limit the scope of the disclosure. That is, it would be obvious to one of skill in the art that other modifications based on the technical spirit of the disclosure may be implemented. In addition, the above-described embodiments may be combined with one another and operated as necessary. For example, an embodiment and some parts of another embodiment of the disclosure may be combined to operate the base station and UE. Also, the embodiments of the disclosure may be applied to other communication systems, and other modified examples based on the technical concept of the embodiments may also be executed.

The invention claimed is:

1. A method performed by a terminal in a mobile communication system, the method comprising:

transmitting, to a mobility management entity associated with a first network, a first message including network capability information of the terminal, in case that a capability of the terminal for a second network is re-enabled;

in case that the network capability information changes from indicating that the second network is not supported to indicating that the second network is supported, receiving, from the mobility management entity, a second message including connection reactivation request information;

releasing a connection for the first network after receiving the second message; and transmitting, to the mobility management entity, a third message for reestablishing a connection for the first network, wherein the third message includes a session identifier, allocated by the terminal, for the second network corresponding to the connection for the first network that is being established, and wherein a gateway entity that supports interworking between the first network and the second network is selected for session continuity of the terminal moving from the first network to the second network.

2. The method of claim 1, wherein at least one quality of service (QoS) parameter corresponding to the connection for the first network that is being established is allocated to the terminal through the gateway entity and is to be used in case that the terminal moves from the first network to the second network.

3. The method of claim 1, wherein the third message is a packet data network (PDN) connectivity request message and the session identifier for the second network is sent via protocol configuration option (PCO).

4. A method performed by a mobility management entity associated with a first network in a mobile communication system, the method comprising:

receiving, from a terminal, a first message including network capability information of the terminal, in case that a capability of the terminal for a second network is re-enabled;

in case that the network capability information changes from indicating that the second network is not supported to indicating that the second network is supported, transmitting, to the terminal, a second message including connection reactivation request information, wherein a connection for the first network is released after transmitting the second message;

receiving, from the terminal, a third message for reestablishing a connection for the first network; and selecting a gateway entity that supports interworking between the first network and the second network for session continuity of the terminal moving from the first network to the second network, wherein the third message includes a session identifier, allocated by the terminal, for the second network corresponding to the connection for the first network that is being established.

5. The method of claim 4, wherein at least one quality of service (QoS) parameter corresponding to the connection for the first network that is being established is allocated to the terminal through the gateway entity and is to be used in case that the terminal moves from the first network to the second network, and wherein the third message is a packet data network (PDN) connectivity request message and the session identifier for the second network is sent via protocol configuration option (PCO).

6. A terminal in a mobile communication system, the terminal comprising:

a transceiver; and a controller configured to:

transmit, to a mobility management entity associated with a first network via the transceiver, a first message including network capability information of the terminal, in case that a capability of the terminal for a second network is re-enabled, in case that the network capability information changes from indicating that the second network is not supported to indicating that the second network is supported, receive, from the mobility management entity via the transceiver, a second message including connection reactivation request information, release a connection for the first network after receiving the second message, and transmit, to the mobility management entity via the transceiver, a third message for reestablishing a connection for the first network, wherein the third message includes a session identifier, allocated by the terminal, for the second network corresponding to the connection for the first network that is being established, and wherein a gateway entity that supports interworking between the first network and the second network is selected for session continuity of the terminal moving from the first network to the second network.

7. The terminal of claim 6, wherein at least one quality of service (QoS) parameter corresponding to the connection for the first network that is being established is allocated to the terminal through the gateway entity and is to be used in case that the terminal moves from the first network to the second network.

8. The terminal of claim 6, wherein the third message is a packet data network (PDN) connectivity request message and the session identifier for the second network is sent via protocol configuration option (PCO).

9. A mobility management entity associated with a first network in a mobile communication system, the mobility management entity comprising:

a transceiver; and a controller configured to:

receive, from a terminal via the transceiver, a first message including network capability information of the terminal, in case that a capability of the terminal for a second network is re-enabled, in case that the network capability information changes from indicating that the second network is not supported to indicating that the second network is supported, transmit, to the terminal via the transceiver, a second message including connection reactivation request information, wherein a connection for the first network is released after transmitting the second message, receive, from the terminal via the transceiver, a third message for reestablishing a connection for the first network, and select a gateway entity that supports interworking between the first network and the second network for session continuity of the terminal moving from the first network to the second network, wherein the third message includes a session identifier, allocated by the terminal, for the second network corresponding to the connection for the first network that is being established.

10. The mobility management entity of claim 9, wherein at least one quality of service (QoS) parameter corresponding to the connection for the first network that is being established is allocated to the terminal through the gateway entity and is to be used in case that the terminal moves from the first network to the second network, and wherein the third message is a packet data network (PDN) connectivity request message and the session identifier for the second network is sent via protocol configuration option (PCO).

* * * * *